United States Patent [19]

Saito et al.

[11] Patent Number: 4,982,424
[45] Date of Patent: Jan. 1, 1991

[54] TELEPHONE HAVING RECEIVE CALL INDICATING FUNCTION AND MUTE/LIGHT KEY

[75] Inventors: Akio Saito; Tomoko Tsukamoto, both of Tokyo; Masahiro Ishigami, Saitama, all of Japan

[73] Assignee: NEC Corporation, Japan

[21] Appl. No.: 523,258

[22] Filed: May 14, 1990

Related U.S. Application Data

[63] Continuation of Ser. No. 143,736, Jan. 13, 1988, abandoned.

[30] Foreign Application Priority Data

Jan. 16, 1987 [JP] Japan .............................. 62-3488[U]
Jan. 30, 1987 [JP] Japan ............................ 62-12667[U]

[51] Int. Cl.⁵ ............................................... H04M 1/00
[52] U.S. Cl. ...................................... 379/376; 379/58; 379/396
[58] Field of Search ............... 379/376, 58, 59, 60, 379/61, 62, 63, 421, 433, 396, 387; 455/89, 90

[56] References Cited

U.S. PATENT DOCUMENTS

| | | | |
|---|---|---|---|
| 2,283,098 | 5/1942 | Shann | 379/433 X |
| 3,474,196 | 10/1969 | Bottos | 379/421 X |
| 4,481,382 | 11/1984 | Villa-Real | 379/61 |
| 4,486,624 | 12/1984 | Puhl et al. | 455/89 X |
| 4,653,094 | 3/1987 | Rasmussen et al. | 379/396 |

FOREIGN PATENT DOCUMENTS 123246  9/1980  Japan .................... 379/396

OTHER PUBLICATIONS

"Mobile Cellular Telephone 17-1002" Radio Shack, 1987 Catalog, Dec. 1986, p. 2.
General Electric CF1000, Received Brochure, Oct. 14, 1986.
NEC M3500, Printed Advertisement, May 5, 1986.

*Primary Examiner*—James L. Dwyer
*Attorney, Agent, or Firm*—Laff, Whitesel, Conte & Saret

[57] ABSTRACT

The housing of a hand held portable telephone has only a limited amount of surface area for providing a number of functions such as providing for a microphone, a receiver, a ringer, a keypad, an information display panel, a panel light, and a control key. By a reoperation of a control key, some equipment on the surface area is reused to perform a second function without requiring additional surface space.

9 Claims, 2 Drawing Sheets

TELEPHONE HAVING RECEIVE CALL INDICATING FUNCTION AND MUTE/LIGHT KEY

This application is a continuation of application Ser. No. 143,736, filed January 13, 1988, now abandoned.

BACKGROUND OF THE INVENTION

The present invention relates to a telephone having a receive call indicating function and a mute/light key and, more particularly, to a hand-held portable (HHP) telephone having such a function and a key.

The HHP telephone of the prior art typically has a keyboard for inputting call signals, and so forth, and a liquid crystal display (LCD) for indicating the telephone number dialled, and so on. For convenient use at night, the HHP telephone further includes a back-light for illuminating the LCD. When called, the HHP telephone alerts the user to the arrival of the call (or receive "call") by turning on and off a message signal such as "CALL", on the LCD, illuminated by the back-light, while outputting a ringing signal.

With the conventional HHP telephone referred to above, however, when the ringing signal is less audible as in a car, for example the intermittent lighting of the message "CALL" may have too little impact to alert the user. Therefore, the user might then fail to notice the arrival of the call. It may be even more difficult to alert the user at night.

Furthermore, when the user makes a call at night, he or she is required to turn on the back-light for inputting control signals from the keyboard. For this purpose, the HHP telephone comprises a switch for turning on and off the back-light, which switch has to be mounted on the face of the HHP telephone. The available space on the HHP telephone casing, however, is limited because the HHP telephone has a built-in keyboard, needs a part by which the user can hold it, and has to be compact in size.

SUMMARY OF THE INVENTION

An object of the present invention, therefore, is to provide a telephone embodying the saving of space by making the back-light switch also serve as a mute key as well.

Another object of the invention is to provide a telephone capable of alerting the user to the arrival of any call, with greater certainty.

According to the present invention, a telephone has a receive call indicating function, a mute/light key, and a display means for displaying at least the arrival of a call. An illuminating means, driven by a driver means, illuminates the display means, a key means manually provides a key signal. A control means intermittently provides a first control signal in response to the arrival of a call, a second control signal when the control means receives the key signal during conversation, and a third control signal when the control means receives the key signal during stand-by state.

A switch means is connected between the driver means and the illuminating means for selectively connecting the driver means to the illuminating means in response to the first to third control signals. A microphone unit means is disabled in response to the second control signal.

BRIEF DESCRIPTION OF THE DRAWINGS

The present invention will be described in further detail below with reference to the accompanying drawings, in which.

DETAILED DESCRIPTION OF THE INVENTION

Figure 1:
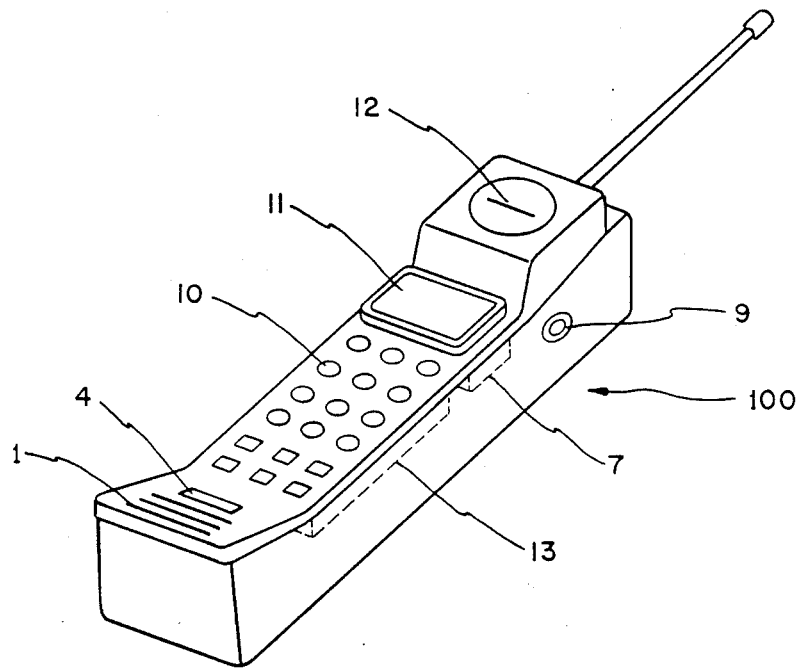
FIG. 1 is a perspective view of a hand-held portable telephone having a receive call indicating function and a mute/light key, which is a preferred embodiment of the invention.

Referring to FIG. 1, a keyboard 10 for inputting a call signal, and so forth, is provided on the front central part of an HHP telephone 100. On the front lower part of telephone 100 are grills 1 and 4 for a ringing speaker or loudspeaker and a microphone unit, which will be described later. An LCD 11 is arranged above the keyboard 10, and further above display 11 is a slit 12 for an earpiece receiver, which will also be described later. The LCD 11 is able to display various items including the arrival of a call and a dialled telephone number. A mute/light key 9 is arranged on the upper right side of the HHP telephone 100 so that it can be readily manipulated when the HHP telephone 100 is held by the user.

Behind the keyboard 10 are back-lights 7 and 13, which are indicated by dashed lines in the illustration. When the back-lights 7 and 13 are on, the LCD 11 and the keyboard 10 are illuminated from behind.

Figure 2:
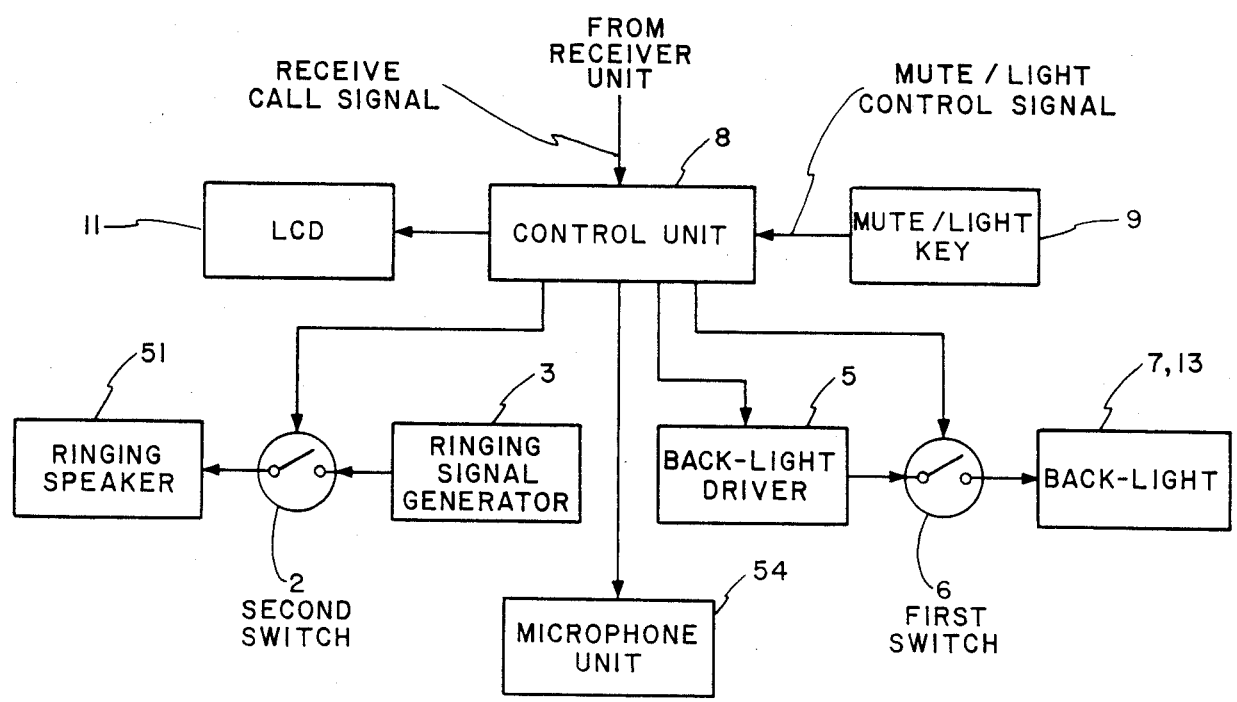
FIG. 2 is a block diagram of the preferred embodiment of the invention.

FIG. 2 is a block diagram of the main sections of the telephone shown in FIG. 1. As shown in FIG. 2, the HHP telephone 100 includes a control unit 8 for controlling a first switch 6 and a second switch 2 according to a receive call signal which is supplied from a receiver unit (not shown). This control unit 8 also controls the turning on and off of a microphone unit 54 and the first switch 6, in response to a mute/light control signal from a mute/light key 9. Furthermore, the control unit 8 controls a back-light driver 5. The first switch 6 connects and disconnects a back-light driver 5 and back-lights 7 and 13 in response to the receive call signal. The second switch 2 connects and disconnects a ringing speaker 51 and a ringing signal generator in response to the receive call signal. The control unit 8 also controls an LCD 11 on which the signal, "CALL", is displayed in response to the arrival of the call.

Figure 3:
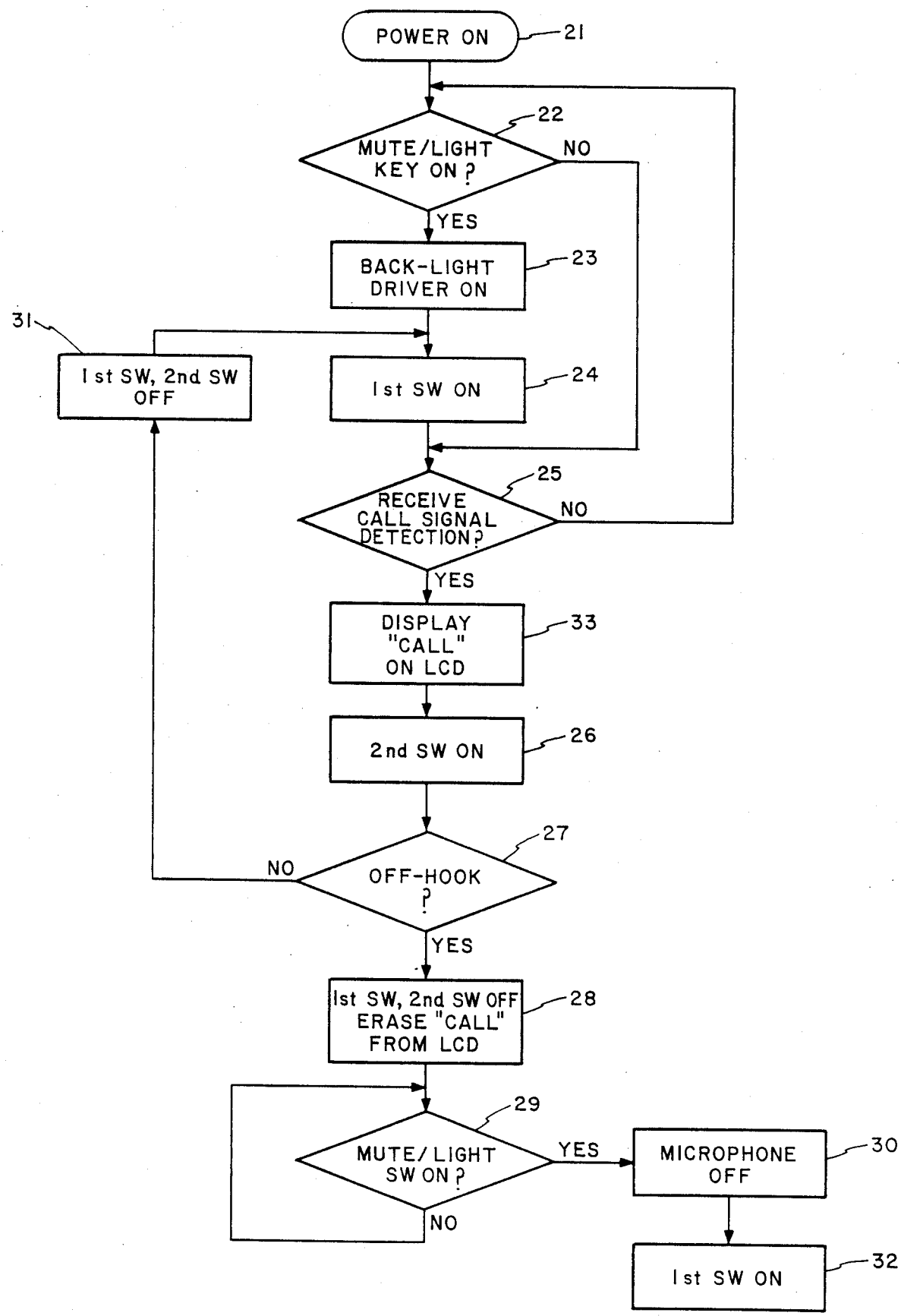
FIG. 3 is a flowchart showing the operation of a control section illustrated in FIG. 2.

Next will be described the operation of the telephone with reference to FIG. 2 and the flowchart of FIG. 3. This flowchart basically shows the following procedure. When the mute/light key 9 (FIG. 2) is closed, either the back-lights 7 and 13 will be turned on during the stand-by condition of the telephone, or the microphone unit 54 will be muted and the back-lights turned on during telephone conversation. If a call arrives, the ringing and the intermittent turning on and off of the back-lights will continue until the user takes the telephone off the hook, that is, until the line is connected to the telephone.

The flowchart (FIG. 3) will now be explained in further detail. First, power is supplied to the telephone at Step 21, followed by Step 22 where a check is made as to whether or not the mute/light key 9 is pressed down. If it is, the back-light driver 5 (FIG. 2) is actuated. The first switch 6 is closed to turn on the back-lights 7 and 13 (Steps 23 and 24), followed by a move ahead to Step 25. Even if the mute/light key 9 is not pressed down at Step 22, the sequence still moves on to Step 25.

At Step 25, the arrival of a call is monitored. If no call arrival is detected, the sequence returns to Step 22. If a receive call is detected, the receive call message "CALL" is displayed on LCD 11 (FIG. 2) at Step 33. The the second switch 2 is turned on to output the ringing signal at Step 26 which is followed by Step 27, where the off-hook state is monitored. If the off-hook state is not detected, the sequence proceeds to Step 31 to turn off the first and second switches 6 and 2. The loop of Steps 24, 25, 33, 26, 27 and 31 causes the ringing and the intermittent turning on and off of the back-lights to continue at a suitable interval, while the display "CALL" appears on LCD 11, and until the user takes the telephone off the hook at Step 27.

If the off-hook state is detected at Step 27, the display signal "CALL" is erased from LCD 11 and the first and second switches 6 and 2 are opened to turn off the back-lights 7 and 13 and discontinue the ringing (Step 28), followed by Step 29. ILf the mute/light key 9 (FIG. 2) is found to be pressed down at Step 29, the sequence proceeds to Steps 30 and 32. Thus, the pressing down of the key 9 mutes the microphone unit 54 and again turns on the back-lights 7 and 13. If the key 9 is not found to be pressed down at Step 29, the state at this step 29 is retained at it is, i.e. the mute/light key 9 is kept off.

The mute key a prior art HHP telephone is intended only for muting the microphone during conversation. In other words, it is never used in a stand-by state. Since the telephone according to the present invention has a mute key with an additional function to turn on the back-lights, the key can also be useful in a stand-by state as well as in the active state.

Muting during conversation means non-use of the microphone and, consequently, moving the handset away from the ear. Since the back-lights are on at this time, the keys will be visible, even in the dark.

Further, flashing the back-lights during a displaying of the receive call message "CALL" on the LCD, the user receives a greater impact, which could be even greater at night. At the same time, the intermittent illumination from behind also facilitates the user's operation of the telephone.

Although the preferred embodiment described above is an HHP, the invention can also be applied to a handset of a car telephone or the like.

To sum up, the present invention can provide a telephone in which a space saving is achieved by combining the back-light switch and the mute key and which can notify the user of the arrival of a call with greater certainty.

What is claimed is:

1. A method of controlling the turning on and off of a back-light of a display panel of a telephone in response to closing and opening a switch which is connected between said back-light and a back-light driver, and the muting of a microphone of the same telephone, wherein said method comprises the following steps of:
   a first step (i) for detecting whether or not a key is pressed down;
   a second step (ii) for turning on back-light driver means if said key is pressed at said first step (i);
   a third step (iii) for closing a switch after the completion of said second step (i);
   a fourth step (iv) for (a) detecting the presence of a received call signal after the completion of said third step (iii), and (b) returning to said first step (i) if the presence of a received call signal is not detected;
   a fifth step (v) for (a) detecting whether or not said telephone is off hook if the presence of a received call signal is detected at said fourth step (iv), and (b) returning to said third step (iii) after an opening of said switch if the telephone is not in an off-hook state;
   a sixth step (vi) for opening said switch if the telephone is in an off-hook state;
   a seventh step (vii) or detecting whether or not said key is pressed after the completion of said sixth step (vi), and for repeating said seventh step until said key is pressed; and
   an eighth step (viii) for simultaneously muting said microphone and closing said switch if said key is pressed at seventh step (vii).

2. A hand held portable telephone comprising a housing having a surface area devoted to equipment comprising at least a microphone, receiver, ringer, key pad, an information display panel, a panel light, and a control key, and control means for enabling said control key to function as a mute control key during a telephone conversation and to function as a light control key of said panel light except during said telephone conversation.

3. A hand held portable telephone comprising a housing having a surface area devoted to equipment comprising at least a microphone, receiver, ringer, key pad, an information display panel, a panel light, and a control key, and control means for intermittently providing a first control signal in response to the arrival of a call, and switch means responsive to said first control signal for actuating said panel light to illuminate the information display panel.

4. A hand held portable telephone comprising a housing having a surface area devoted to equipment comprising at least a microphone, receiver, ringer, key pad, an information display panel, a panel light, and a control key, and control means for producing a first control signal responsive to an arrival of a call, for producing a second control signal jointly responsive to an operation of said control key and a busy condition at said telephone, and for producing a third control signal jointly responsive to an operation of said control key and an idle condition at said telephone, means responsive to said first and third signals for actuating said panel light to illuminate said information display panel, and means responsive to said second signal for disabling said microphone.

5. A telephone having a received call indicating function and a mute/light key, said telephone comprising:
   information display panel means for displaying at least the information of the arrival of a call;
   illuminating means for illuminating said information display panel means;
   key means for manually providing a key signal;
   control means for providing a first control signal in response to the arrival of a call, for providing a second control signal in response to said key signal during conversation, and for providing a third control signal in response to said key signal during stand-by state;
   driver means for driving intermittently said illuminating means in response to said first control signal, and for driving continuously said illuminating means in response to said third control signal; and
microphone unit means for being in a muted state in response to said second control signal.

6. A telephone at claimed in claim 5, wherein said information display panel means is comprised of a liquid crystal display (LCD).

7. A telephone at claimed in claim 6, wherein said illuminating means is comprised of a back-light for illuminating said LCD from behind.

8. A telephone having a receive call indicating function and a mute/light key, said telephone comprising:
information display panel means for displaying at least the information of the arrival of a call;
illuminating means of illuminating said information display panel means;
key means for manually providing a key signal;
control means for providing a control signal in response to the arrival of a call; and
driver means for driving intermittently said illuminating means in response to said control signal.

9. A telephone having a receive call indicating function and a mute/light key, said telephone comprising:
information display panel means for displaying at least the information of the arrival of a call;
illuminating means for illuminating said information display panel means;
key means for manually providing a key signal;
control means for providing a first control signal in response to said key signal during a conversation, and for providing a second control signal in response to said key signal during a stand-by state;
driver means for driving continuously said illuminating means in response to said second control signal; and
microphone unit means for placing said telephone in a muted state in response to said first control signal.

* * * * *